(12) United States Patent
Kabadi et al.

(10) Patent No.: US 10,142,890 B2
(45) Date of Patent: Nov. 27, 2018

(54) METHOD AND SYSTEM TO MINIMIZE DELAY IN CIRCUIT-SWITCHED FALLBACK (CSFB) PROCEDURE

(71) Applicant: Samsung Electronics Co., Ltd., Suwon-si, Gyeonggi-do (KR)

(72) Inventors: Ajaykumar Kabadi, Bangalore (IN); Kedar Santosh Kumar Aalla, Bangalore (IN); Pavan Kumar Devarayanigari, Pradesh (IN); Prakash Rao, Bangalore (IN); Ravi Krishna Hari Haran Sripada, Bangalore (IN); Srinivas Chinthalapudi, Visakhapatnam (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 14/759,159

(22) PCT Filed: Jan. 3, 2014

(86) PCT No.: PCT/KR2014/000061
§ 371 (c)(1),
(2) Date: Jul. 2, 2015

(87) PCT Pub. No.: WO2014/107054
PCT Pub. Date: Jul. 10, 2014

(65) Prior Publication Data
US 2015/0350965 A1 Dec. 3, 2015

(30) Foreign Application Priority Data

Jan. 4, 2013 (IN) ............................... 48/CHE/2013
Jul. 11, 2013 (IN) ............................... 48/CHE/2013

(51) Int. Cl.
*H04W 36/00* (2009.01)
*H04W 48/08* (2009.01)
(Continued)

(52) U.S. Cl.
CPC ........ *H04W 36/0022* (2013.01); *H04W 48/08* (2013.01); *H04W 48/16* (2013.01); *H04W 48/18* (2013.01)

(58) Field of Classification Search
CPC ..... H04W 48/08; H04W 48/16; H04W 48/18; H04W 36/0022
(Continued)

(56) References Cited

U.S. PATENT DOCUMENTS 8,306,537 B2 * 11/2012 Burbidge .......... H04W 36/0088
455/435.2
8,644,273 B2 * 2/2014 Choi ................. H04W 72/0453
370/328
(Continued)

FOREIGN PATENT DOCUMENTS

JP  2012-532531 A  12/2012
KR  10-2012-0085857 A  8/2012
(Continued)

*Primary Examiner* — Man U Phan
(74) *Attorney, Agent, or Firm* — Jefferson IP Law, LLP (57) ABSTRACT

A method and system for minimizing delay in circuit-switched fallback (CSFB) procedure is disclosed. The disclosed method provides two different approaches for optimizing the delay during the CSFB procedure. In the first approach, user equipment (UE) receives a Location Area Identifier (LAI along with the Radio Access Technology (RAT) information from the network (LTE network). The UE uses the received RAT information from the network for switching to the target Radio Access Network (RAN) without informing to the LTE network. In another approach, the UE obtains the RAT information by performing a back-
(Continued)

ground scan in idle mode, when the UE receives LAI without RAT information from the network.

20 Claims, 5 Drawing Sheets

(51) Int. Cl.
  *H04W 48/16* (2009.01)
  *H04W 48/18* (2009.01)
(58) Field of Classification Search
  USPC .......... 370/216–328, 331–348; 455/436–522
  See application file for complete search history.

(56) References Cited

U.S. PATENT DOCUMENTS

| | | | | |
|---|---|---|---|---|
| 8,682,322 | B2* | 3/2014 | Wallis | H04W 36/0022 |
| | | | | 455/433 |
| 8,705,445 | B2* | 4/2014 | Watfa | H04W 36/0022 |
| | | | | 370/328 |
| 8,929,310 | B2* | 1/2015 | Faurie | H04W 36/0022 |
| | | | | 370/329 |
| 9,026,112 | B2* | 5/2015 | Klingenbrunn | H04W 48/16 |
| | | | | 455/435.2 |
| 9,055,496 | B2* | 6/2015 | Das | H04W 36/14 |
| 9,155,028 | B2* | 10/2015 | Kim | H04W 48/16 |
| 9,161,268 | B2* | 10/2015 | Keller | H04W 76/027 |
| 9,379,866 | B2* | 6/2016 | Miao | H04L 5/0048 |
| 9,565,598 | B2* | 2/2017 | Devarayanigari | |
| | | | | H04W 36/0022 |
| 9,681,480 | B2* | 6/2017 | Adjakple | H04W 76/025 |
| 2010/0297979 | A1* | 11/2010 | Watfa | H04W 8/205 |
| | | | | 455/404.1 |
| 2010/0317315 | A1 | 12/2010 | Burbidge et al. | |
| 2011/0002314 | A1 | 1/2011 | Choi et al. | |
| 2011/0110302 | A1* | 5/2011 | Faurie | H04W 36/0022 |
| | | | | 370/328 |
| 2011/0149852 | A1 | 6/2011 | Olsson et al. | |
| 2012/0218889 | A1* | 8/2012 | Watfa | H04W 60/04 |
| | | | | 370/230 |
| 2013/0044709 | A1* | 2/2013 | Adjakple | H04W 76/025 |
| | | | | 370/329 |
| 2014/0051443 | A1* | 2/2014 | Diachina | H04W 36/0022 |
| | | | | 455/436 |
| 2014/0148143 | A1 | 5/2014 | Choi et al. | |
| 2014/0177596 | A1 | 6/2014 | Watfa et al. | |
| 2015/0071252 | A1 | 3/2015 | Faurie et al. | |
| 2015/0072678 | A1* | 3/2015 | Zhang | H04W 8/065 |
| | | | | 455/433 |
| 2017/0078926 | A1* | 3/2017 | Zhu | H04W 36/0022 |

FOREIGN PATENT DOCUMENTS

| | | |
|---|---|---|
| KR | 10-2012-0103603 A | 9/2012 |
| WO | 2011/073913 A1 | 6/2011 |

* cited by examiner

METHOD AND SYSTEM TO MINIMIZE DELAY IN CIRCUIT-SWITCHED FALLBACK (CSFB) PROCEDURE

TECHNICAL FIELD

The present invention relates to wireless communication systems and more particularly relates to a method and system for minimizing delay in providing circuit switched (CS) services to a User Equipments (UE).

BACKGROUND ART

The Third ($3^{rd}$) Generation Partnership Project (3GPP) Long Term Evolution (LTE) is an evolving high speed, high capacity standard for cellular communication. Currently, UE equipped with LTE technology utilize LTE Packet Switched (PS) domain to handle data traffic while the voice traffic is handled by legacy Circuit Switched (CS) networks (legacy Radio Access Technologies (RATs)) such as Global System for Mobile communications (GSM), Universal Mobile Terrestrial System (UMTS) and GSM EDGE Radio Access Network (GERAN). To support CS domain communication such as voice calls, the UE in LTE has to switch to CS supporting legacy RATs.

The Circuit Switched Fallback (CSFB) procedure standardized by 3GPP technical specification enables the UEs to perform this switching during Mobile Originated (MO) or Mobile Terminated (MT) calls. The 3GPP standard defines Inter-RAT (I-RAT) for mobility (switching) between LTE and earlier 3GPP technologies such as UMTS and GERAN. To acquire a legacy RAT during I-RAT switching, the 3GPP standard provides redirection based CSFB procedure.

In accordance with existing 3GPP standard for redirection based CSFB procedure, when the CS call is attempted while the UE is in LTE, then the UE starts an Extended Service Request (ESR) procedure. When the ESR is received by Evolved Universal Terrestrial Radio Access Network (EUTRAN) Node B (eNB) of the LTE network, the eNB provides the UE with Radio Resource Control (RRC) connection release along with redirection request including the target RAT frequency on to which the UE can camp for CS call.

If a user attempts to make normal or an emergency call, when the UE is camped on EUTRAN network, the CSFB Call Request may fail because of various reasons. The reasons could be temporary causes like Mobile Switching Center (MSC) not reachable, network congestion, temporary radio related problems (for example, random access failure, Radio Resource Control (RRC) connection failure) or permanent causes (CS domain not available) and so on.

Further, in case of temporary or radio failure causes according to specification (3GPP 24.301 TS), it is mentioned that the UE should move to GERAN or UTRAN. However, there is no information about RAT, to which UE has to select in case of a voice call. The lack of this information may reject or delay the call till the registration is completed on GERAN or UTRAN. Hence, it is important for the UE to maintain RAT Info which will help to camp on to the cell immediately and process the CS call without long delay.

DISCLOSURE OF INVENTION

Technical Problem

The principal object of the embodiments herein is to provide a method and system for optimizing the delay in circuit-switched fallback (CSFB) procedure.

Another object of the invention is to provide a method and system for minimizing the delay in providing CS services to User Equipment (UE) in a CSFB scenario.

Solution to Problem

Accordingly the invention provides a method for minimizing delay in providing circuit switched (CS) services to a User Equipment (UE) connected to a Long Term Evolution (LTE) network, wherein the method comprises switching to a target radio access network (RAN) based on at least one of: information received from the LTE network and the information generated by performing a background scan by the UE for minimizing the delay in obtaining the CS services.

Accordingly the invention provides a User Equipment (UE) for minimizing delay in obtaining circuit switched (CS) services when the UE is connected to a Long Term Evolution (LTE) network, wherein the UE comprises an integrated circuit. Further the integrated circuit comprises at least one processor and at least one memory. The memory comprises a computer program code within the integrated circuit. At least one memory and the computer program code with the at least one processor cause the UE to switch to a target radio access network (RAN) based on at least one of: information received from the LTE network and the information generated by performing a background scan for minimizing the delay in obtaining the CS services.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

BEST MODE FOR CARRYING OUT THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system for optimizing delay in circuit-switched fallback (CSFB) procedure. The disclosed method provides two different approaches for optimizing the delay during the CSFB procedure. In the first approach, a User Equipment (UE) receives a Location Area Identifier (LAI) along with Radio Access Technology (RAT) information from a network (LTE network). The UE uses the received RAT information from the network for switching to the target Radio Access Network (RAN), without informing the LTE network. In another approach, the UE obtains the RAT information by performing a background scan in idle mode, when the UE receives LAI without RAT information from the network.

In an embodiment, the UE maintains a table in which the LAI and the corresponding RAT information are stored. The UE uses this table for switching to the target RAN during the CSFB procedure.

Further, the table is updated using the background scan after expiry of a time interval measured by a validation timer.

Throughout the description, the terms Long Term Evolution network or Evolved Universal Terrestrial Radio Access Network, Universal Mobile Telecommunication System network or 3G network, 2G network or GSM Edge Radio Access Network are used interchangeably.

Referring now to the drawings, and more particularly to FIGS. 1 through 5, where similar reference characters denote corresponding features consistently throughout the figures, there are shown preferred embodiments.

Figure 1:
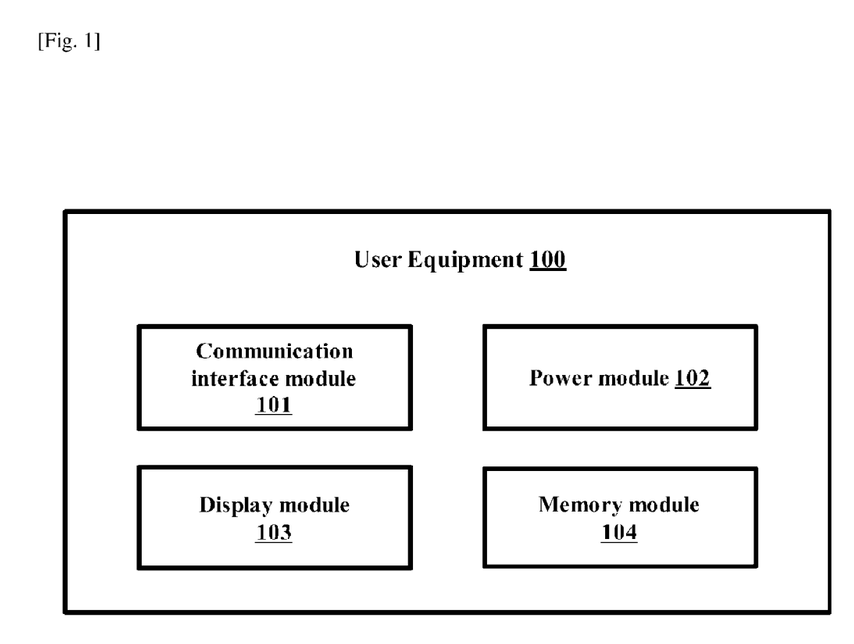
FIG. 1 illustrates the block diagram of a User Equipment (UE) with various modules, according to embodiments as disclosed herein.

FIG. 1 illustrates the block diagram of a User Equipment (UE) with various modules, according to embodiments as disclosed herein. As depicted in the figure, the User Equipment (UE) 100 comprises a communication interface module 101, a power module 102, a display module 103 and a memory module 104. The communication interface module 101 helps the UE 100 to connect to the wireless network. The power module 102 holds the battery information and status of battery power in the UE 100. The battery information comprises the amount of charge that the device possesses and the time period for which the UE 100 will be in operation and so on. The display module 103 of the UE 100 comprises of a user interface which can be a virtual keypad or through any other means by which a user can input some data into the UE 100. The memory module 104 may include a random access memory (RAM) or another type of dynamic storage device that may store information and instructions, for example an application, for execution by processor, a read-only memory (ROM) device or another type of static storage device.

In an embodiment, the memory module 104, is used for storing the LAI and associated RAT information in a table. In an embodiment, the length of the LAI and RAT information table can be configurable.

The CSFB scenario has been described herein for better understanding of the embodiments described herein. Initially, the UE 100 is connected to the EUTRAN (LTE network). When the UE 100 is connected to EUTRAN for obtaining packet data services, there is a possibility that a mobile originated (MO) call or a Mobile terminated (MT) call takes place at the UE 100.

In an embodiment, the EUTRAN sends a paging message to the UE 100. The paging message from the EUTRAN indicates that the UE 100 has an active incoming call (MT call).

As the EUTRAN does not support circuit switched services, the UE 100 has to fall back from the LTE network (EUTRAN) for receiving the CS call (MT call) and this procedure of fallback from LTE network to other RANs (for example, GSM EDGE Radio Access Network (GERAN) or Universal Terrestrial Radio Access Network (UTRAN)) that supports CS services is commonly termed as Circuit Switched Fallback (CSFB).

The UE 100 sends an Extended Service Request (ESR) to the EUTRAN for initiating the CSFB procedure.

In the case of termination of a voice call, the UE 100 has to receive a paging message. In the case of a mobile originating call, the UE 100 has to send a service request (ESR) message. The UE 100 may also be involved in data transfer when a voice call has to be set up.

Several CSFB procedures exist for the various target radio access technologies (RATs). When the MSC receives an incoming voice call, it sends a paging request to a Mobile Management Entity (MME) over the SGs interface. The MME establishes an S1 connection and sends the CS SERVICE NOTIFICATION message to the UE 100. The MME informs the MSC with the SERVICE REQUEST message over SGs interface that the UE 100 is in connected mode. Further, the UE 100 upon receiving the CS SERVICE NOTIFICATION message, sends an EXTENDED SERVICE REQUEST (ESR) message. This request message is used to respond to the CS fallback request from the MME and includes a "CSFB response" indicator that indicates whether the UE 100 accepts or rejects a paging for CS fallback. If the UE 100 accepts the CSFB, then the MME informs the EUTRAN with a UE CONTEXT MODIFICATION REQUEST, which indicates that the UE 100 should be moved to UTRAN or GERAN by means of CSFB procedure.

Further, the eNodeB sends a CONTEXT MODIFICATION RESPONSE to the MME stating that the UE 100 is ready for a CS fallback.

The EUTRAN (eNodeB) may request measurement reports of UTRAN or GERAN target cells from the UE 100 to determine a suitable carrier frequency on the target radio access technology for the CSFB procedure.

The EUTRAN sends a RRC connection release with redirection to either GERAN or UTRAN. Further, the EUTRAN requests the MME to release the S1 connection for the UE 100 with the UE CONTEXT RELEASE REQUEST message. This message also specifies whether the UE 100 would be able to receive packet switched services in the target cell.

The UE 100 selects a cell of the target RAN (GERAN or UTRAN) and establishes a radio signalling connection with that cell using the CSFB procedure as described above.

In the current scenario, when a user attempts to make a normal or emergency call when the UE 100 is camped on LTE network, the CSFB call request may fail due to various reasons such as Mobile Switching Center (MSC) not reachable, network congestion, temporary radio related problems (for example, random access failure, Radio Resource Control (RRC) connection failure) and so on. Hence, the normal call or the emergency call will be delayed and there is a need for minimizing the call delay during the CSFB procedure.

Figure 2:
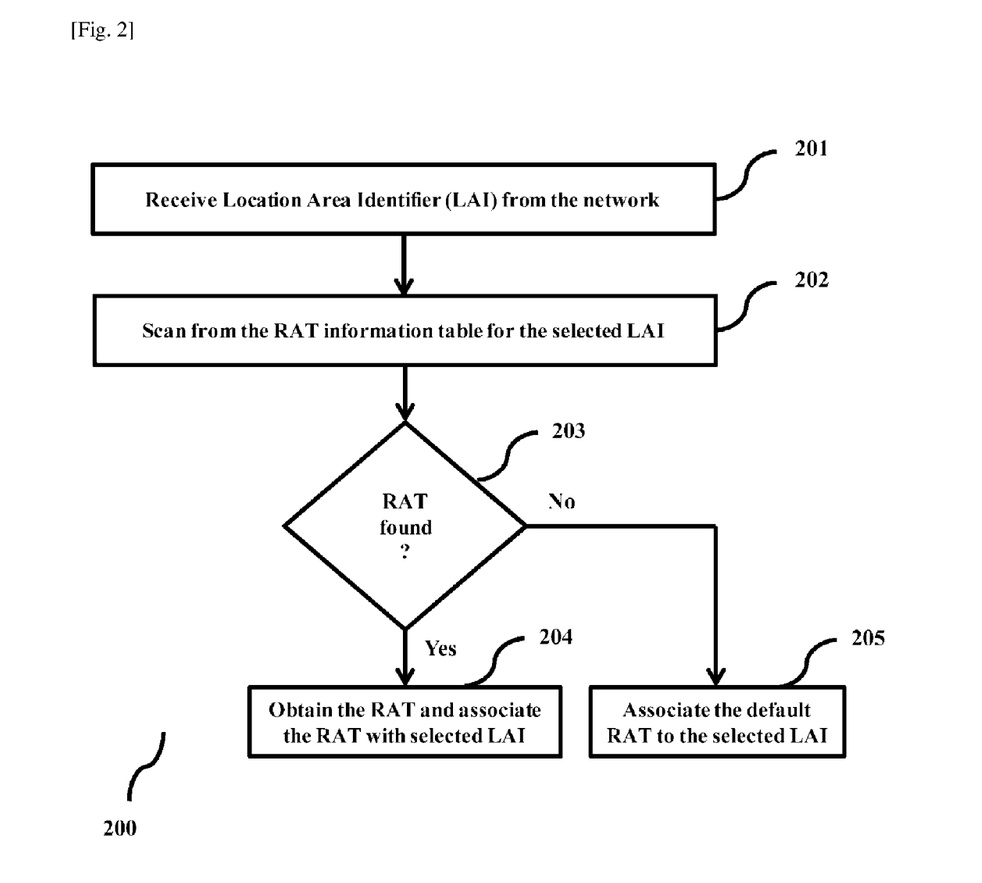
FIG. 2 illustrates a flow diagram explaining the process of obtaining RAT information from the LAI received from the network, according to embodiments as disclosed herein.

In order to minimize the delay in CSFB scenario, the method describes the following flow diagram 200, which explains the various steps involved in minimizing the delay of the CS call.

In an embodiment, the UE 100 receives the RAT information along with the Location Area Identifier (LAI) from the network (EUTRAN). When the RAT information is received, the UE 100 uses this RAT information for switching quickly to the target RAN for continuing the MO call procedure. When the RAT information is provided to the UE 100, the delay in switching to the target RAN for obtaining the CS services can be minimized.

FIG. 2 illustrates a flow diagram explaining the process of obtaining RAT information from the LAI received from the network, according to embodiments as disclosed herein. Initially the UE 100 receives (201) Location Area Identifier (LAI) from the network. In an embodiment, the UE 100 receives the LAI in the initial attach accept request from the EUTRAN. The LAI received from the EUTRAN indicates location area of the UTRAN or GERAN to which the UE 100 is to be redirected during the CSFB scenario.

Further, the UE 100 maintains a RAT information table which includes the LAI, RAT information and the frequency information of the cells. The UE 100 updates the table, when the LAI changes with the RAT information and frequency information.

Figure 3:
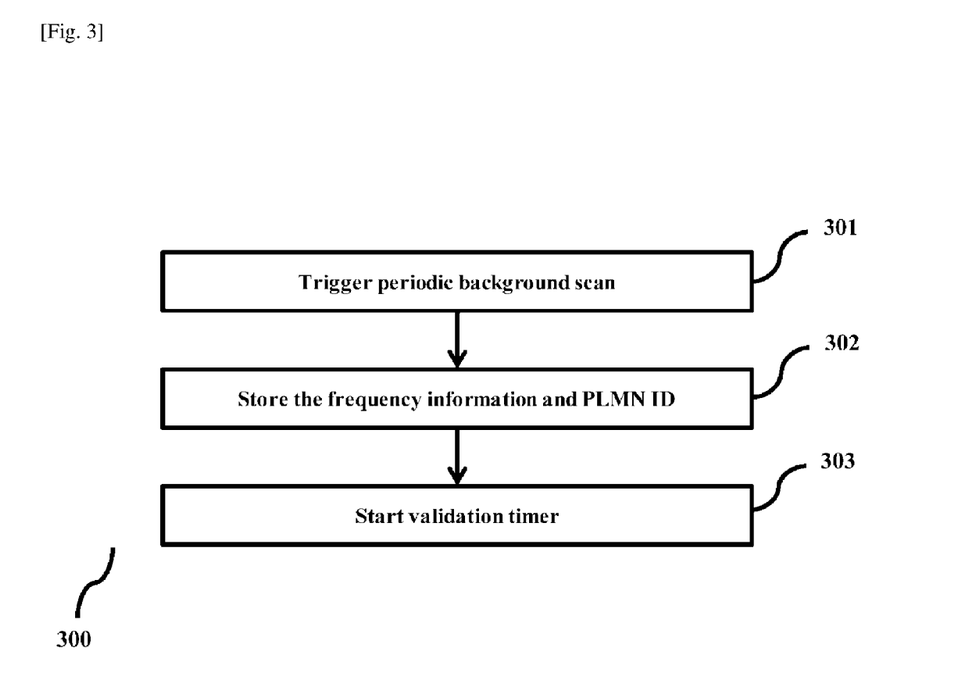
FIG. 3 illustrates a flow diagram explaining the process of performing background scan for obtaining RAT information, according to the embodiments as disclosed herein.

When the UE 100 receives the LAI, the UE 100 scans (202) for the RAT information for the selected LAI. If the UE 100 determines (203) the RAT information for selected LAI, the UE 100 associates (204) the determined RAT information to the selected LAI. In case the RAT Information is not found (205) for the selected LAI, then the UE 100 updates the table with the default RAT (RAT that is normally provided to the UE 100 by the network operator for CS services). In this way, the UE 100 receives the LAI and updates the RAT information associated with the LAI received from the EUTRAN. The various actions in flow diagram 200 may be performed in the order presented, in a different order or simultaneously. Further, in some embodiments, some actions listed in FIG. 2 may be omitted FIG. 3 illustrates a flow diagram explaining process of performing background scan for obtaining RAT information, according to the embodiments as disclosed herein. When it is determined that the RAT information is not present for a selected LAI received from the EUTRAN in the RAT information table, then the UE 100 performs a background scan for obtaining the RAT information. The flow diagram 300 provides the various steps involved in performing background scan for obtaining the RAT information.

The UE 100 triggers (301) the periodic background scan in idle mode for identifying the RAT information. During the periodic background scan, the UE 100 performs scanning of inter-frequency RAT's (IRAT's). The UE 100 obtains the RAT information from the background scan. Along with the RAT information, the UE 100 obtains the frequency information, LAI and the Public Land Mobile Network (PLMN) ID during the background scan.

Further, the UE 100 stores (302) the frequency information and the PLMN ID. In an embodiment, the UE 100 updates the RAT information table when the LAI obtained during the background scan is matched with LAI received from the EUTRAN in the initial attaches accept request.

The UE 100 starts (303) a validation timer during the background scan and after the expiry of the validation timer, the background scan is repeated by the UE 100. The RAT information table is updated whenever the background scan is performed in idle mode by the UE 100.

After performing the background scan, the RAT information table contains the LAI, RAT information and the frequency information. The frequency information can be modified when a modified System Information Block (SIB) is received from the network. The various actions in flow diagram 300 may be performed in the order presented, in a different order or simultaneously. Further, in some embodiments, some actions listed in FIG. 3 may be omitted.

Figure 4:
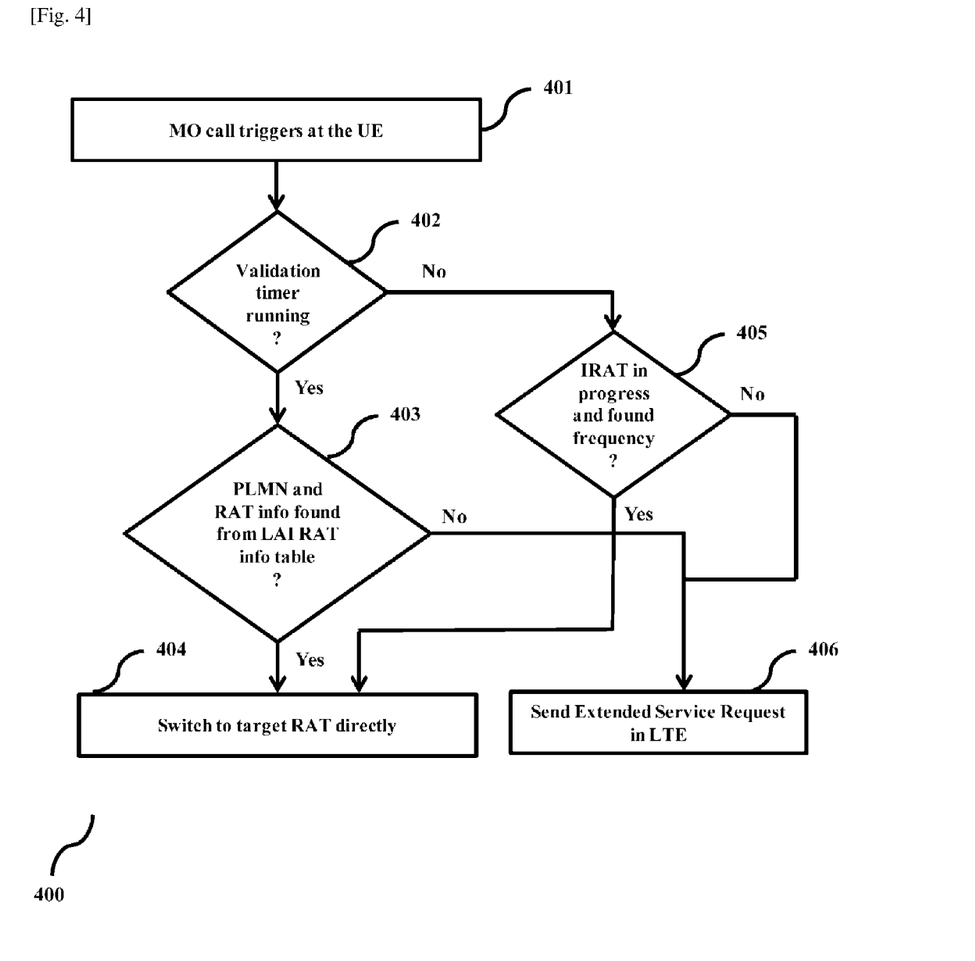
FIG. 4 illustrates a flow diagram explaining the process of verifying RAT information table for switching to a target RAN by the UE, according to embodiments as disclosed herein.

FIG. 4 illustrates a flow diagram explaining the process of verifying RAT information table for switching to a target RAN by the UE, according to embodiments as disclosed herein. Initially, the UE 100 is connected to the EUTRAN (LTE network). When the UE 100 is connected to EUTRAN for obtaining packet data services, there is a possibility that a mobile originated (MO) call or a Mobile terminated (MT) call triggers (401) at the UE 100 that leads to the CSFB procedure.

In the above scenario, the UE 100 determines (402) whether the validation timer is running If it is determined that the validation timer is running, the UE 100 checks (403) for the availability of PLMN ID, RAT information from the LAI RAT information table. When the validation timer is running, it is to be noted that the LAI RAT information table contains valid LAI, RAT information and frequency information.

If the RAT information is identified from the LAI RAT information table, then the UE 100 switches (404) to the target RAT directly and camps on the target RAT for continuing the MO call procedure. If the PLMN ID and the RAT information are not available from the LAI RAT information table, then the UE 100 sends (406) the ESR to the EUTRAN and follows the normal procedure for redirection to the UTRAN or the GERAN.

When it is determined that the validation timer is not running, the UE 100 determines (405) whether the background scan for identification of inter frequency RAT is in progress. During the background scan, if the UE identifies the frequency of the RAT, then the UE 100 switches (404) to the target RAT directly and camps on the target RAT for continuing the MO call procedure.

During the background scan, if the frequency of the RAT is not found by the UE 100, then the UE 100 sends (406) the ESR to the EUTRAN and follows the normal procedure for redirection to the UTRAN or the GERAN. The various actions in flow diagram 400 may be performed in the order presented, in a different order or simultaneously. Further, in some embodiments, some actions listed in FIG. 4 may be omitted.

Figure 5:
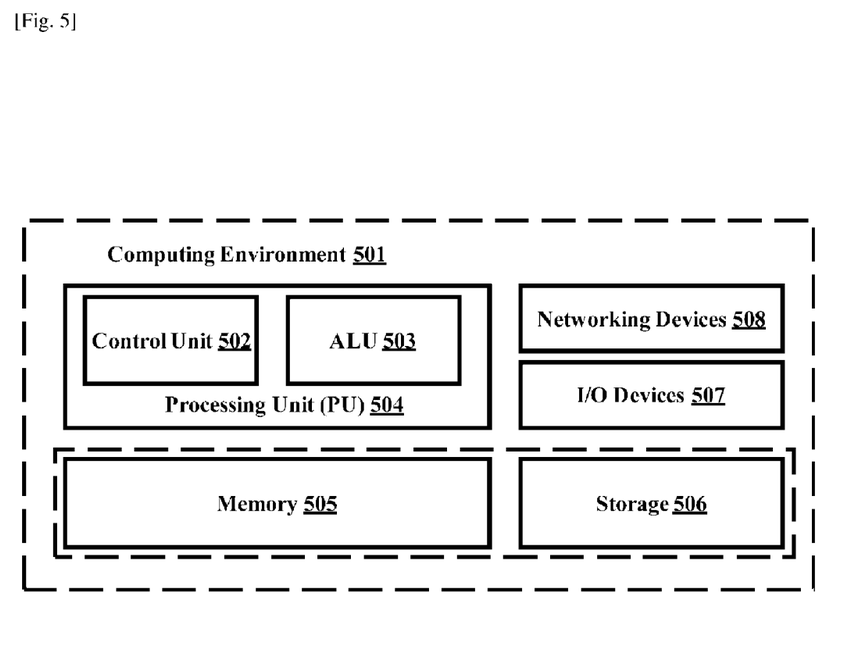
FIG. 5 illustrates a computing environment implementing the method and system for minimizing the delay in providing CS services to UE in a CSFB scenario, according to the embodiments as disclosed herein.

FIG. 5 illustrates a computing environment implementing the method and system for minimizing the delay in providing CS services to UE in a CSFB scenario, according to the embodiments as disclosed herein. As depicted the computing environment 501 comprises at least one processing unit 504 that is equipped with a control unit 502 and an Arithmetic Logic Unit (ALU) 503, a memory 505, a storage unit 506, plurality of networking devices 508 and a plurality Input output (I/O) devices 507. The processing unit 504 is responsible for processing the instructions of the algorithm. The processing unit 504 receives commands from the control unit in order to perform its processing. Further, any logical and arithmetic operations involved in the execution of the instructions are computed with the help of the ALU 503.

The overall computing environment 501 can be composed of multiple homogeneous and/or heterogeneous cores, multiple CPUs of different kinds, special media and other accelerators. The processing unit 504 is responsible for processing the instructions of the algorithm. Further, the plurality of processing units 504 may be located on a single chip or over multiple chips.

The algorithm comprising of instructions and codes required for the implementation are stored in either the memory unit 505 or the storage 506 or both. At the time of execution, the instructions may be fetched from the corresponding memory 505 and/or storage 506, and executed by the processing unit 504.

In case of any hardware implementations various networking devices 508 or external I/O devices 507 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1 and 5 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method in a terminal connected to a first network for a data service, the method comprising:
   receiving, from the first network, a first location area identifier (LAI) of a second network for a circuit switched (CS) service;
   performing a scanning in an idle mode to obtain a second LAI and frequency information associated with the second LAI; and
   after detecting that the first LAI matches the second LAI, switching from the first network to the second network based on the frequency information associated with the second LAI.

2. The method of claim 1, wherein the receiving of the first LAI comprises receiving the first LAI responsive to a triggering of a voice call.

3. The method of claim 1, further comprising determining radio access technology (RAT) information in a RAT information table corresponding to the first LAI.

4. The method of claim 1, further comprising associating radio access technology (RAT) information with the first LAI.

5. The method of claim 4, further comprising:
   storing the first LAI and the associated RAT information in the terminal; and
   updating the RAT information upon expiry of a time interval during the scanning,
   wherein the scanning is repeated by the terminal upon expiry of the time interval.

6. The method of claim 1, wherein the scanning comprises scanning on at least one frequency of the second network.

7. A terminal connected to a first network for a data service, the terminal comprising:
   at least one processor configured to:
      receive, from the first network, a first location area identifier (LAI) of a second network for a circuit switched (CS) service,
      perform a scanning in an idle mode to obtain a second LAI and frequency information associated with the second LAI, and
      after detecting that the first LAI matches the second LAI, switch from the first network to the second network based on the frequency information associated with the second LAI.

8. The terminal of claim 7,
   wherein the at least one processor is further configured to receive the first LAI responsive to a triggering of a voice call.

9. The terminal of claim 7, wherein the at least one processor is further configured to determine radio access technology (RAT) information in a RAT information table corresponding to the first LAI.

10. The terminal of claim 7, wherein the at least one processor is further configured to associate radio access technology (RAT) information with the first LAI.

11. The terminal of claim 10,
    wherein the at least one processor is further configured to:
       store the first LAI and the associated RAT information in the terminal, and
       update the RAT information upon expiry of a time interval during the scanning, and
    wherein the scanning is repeated by the terminal upon expiry of the time interval.

12. The terminal of claim 8, wherein the scanning comprises scanning on at least one frequency of the second network.

13. A system comprising a terminal connected to a first network for a data service and at least one radio access network (RAN), the system comprising;
    a terminal comprising:
       at least one processor; and
       at least one memory, operatively coupled to the at least one processor, having one or more computer program code,
    wherein the one or more computer program code, when executed by the at least one processor, causes the at least one processor to:
       receive, from the first network, a first location area identifier (LAI) of a second network for a circuit switched (CS) service,
       perform a scanning in an idle mode to obtain a second LAI and frequency information associated with the second LAI, and
       after detecting that the first LAI matches the second LAI, switch from the first network to the second network based on the frequency information associated with the second LAI.

14. The system of claim 13, wherein the one or more computer program code, when executed by the at least one processor, further causes the at least one processor to receive the first LAI responsive to a triggering of a voice call.

15. The system of claim 13, wherein the one or more computer program code, when executed by the at least one processor, causes the at least one processor to determine radio access technology (RAT) information in a RAT information table corresponding to the first LAI.

16. The system of claim 13, wherein the one or more computer program code, when executed by the at least one processor, further causes the at least one processor to associate radio access technology (RAT) information with the first LAI.

17. The system of claim 16,
wherein the one or more computer program code, when executed by the at least one processor, further causes the at least one processor to store the first LAI and the associated RAT information in the terminal, and update the RAT information upon expiry of a time interval during the scanning, and
wherein the scanning is repeated by the terminal upon expiry of the time interval.

18. The system of claim 13, wherein the scanning comprises scanning on at least one frequency of the second network.

19. The method of claim 1, wherein the switching from the first network to the second network comprises:
storing the frequency information associated with the second LAI in response to detecting that the first LAI matches the second LAI; and
switching from the first network to the second network based on the stored frequency information associated with the second LAI.

20. The terminal of claim 7, wherein the at least one processor is further configured to:
store the frequency information associated with the second LAI in response to detecting that the first LAI matches the second LAI; and
switch from the first network to the second network based on the stored frequency information associated with the second LAI.

* * * * *